Sept. 13, 1960 E. M. DETERS 2,952,388
LEAK DETECTOR
Filed Oct. 8, 1958 2 Sheets-Sheet 1
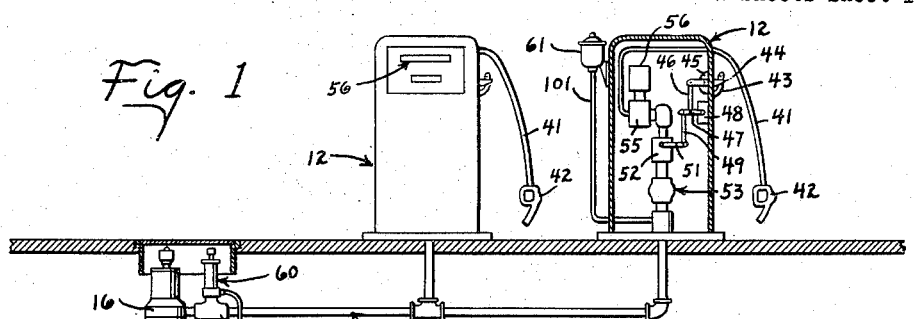
Fig. 1
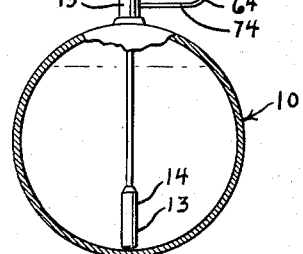
Fig. 3A
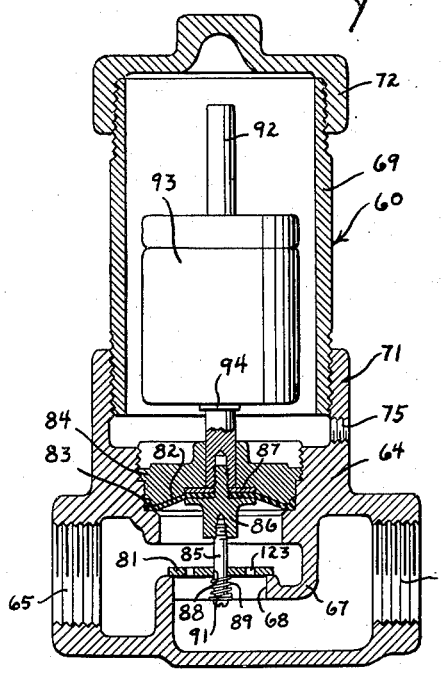
Fig. 3B
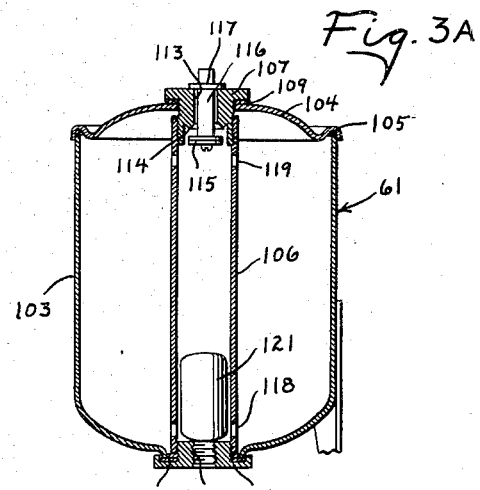
Fig. 2
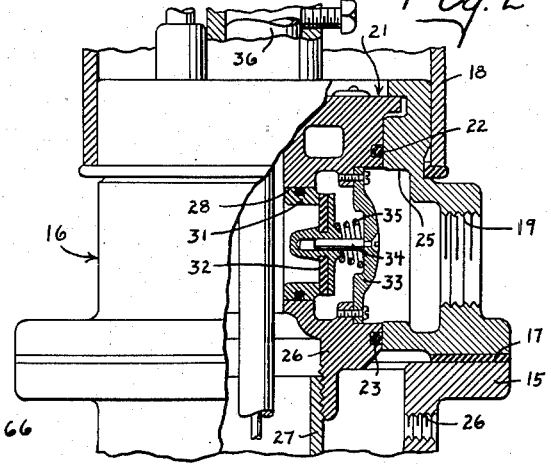
Inventor
Elmer M. Deters
By McCanna, Morsbach & Pillote
Atty's Sept. 13, 1960 E. M. DETERS 2,952,388
LEAK DETECTOR
Filed Oct. 8, 1958 2 Sheets-Sheet 2

Inventor
Elmer M. Deters
By McCanna, Morsbach & Pillote
Att'ys

United States Patent Office 2,952,388
Patented Sept. 13, 1960

2,952,388

LEAK DETECTOR

Elmer M. Deters, Davenport, Iowa, assignor to Red Jacket Manufacturing Co., Davenport, Iowa, a corporation of Iowa Filed Oct. 8, 1958, Ser. No. 766,121
14 Claims. (Cl. 222—52)

This invention relates to a leak detecting system and particularly to a system for detecting leaks in a supply line through which fluid is intermittently delivered.

In the dispensing of gasoline at service stations, it has recently been proposed to locate the pump at the underground tank for delivering the gasoline from the tank to one or more remote pedestals. The gasoline in the supply line leading from the tank to the pedestal is therefore maintained under pressure so that the more volatile components of the gasoline do not tend to vaporize. However, if there is a leak in the supply line of such a system, the liquid will flow from the supply line into the relatively lower pressure area around the line. When handling explosive and inflammable materials such as gasoline, the accumulations from even a relatively small leak will, over a period of time, produce a very hazardous condition. In those service station installations wherein the pump is located at the tank and the supply line is maintained under pressure, it is therefore necessary to detect even relatively small leaks from the supply line.

The detection of leaks from the supply line is complicated by the fact that the gasoline is only intermittently pumped through the line and the pressure in the line under normal operating conditions, and in the absence of any leak, will fluctuate widely from full pump discharge pressure down to zero pressure and sometimes to even below atmospheric pressure. Thus, when the pump is started and the discharge valve at the remote pedestal closed, the pressure in the line will build up to substantially full pump discharge pressure. When one or more discharge valves on the associated dispensing pedestals are opened, the pressure will drop somewhat in the line dependent upon the rate of flow from the line. When the pump is stopped, the pressure in the line will also vary dependent upon thermal expansion and contraction of the gasoline therein with changes in ambient temperature.

When handling explosive and inflammable materials such as gasoline, it is not sufficient to merely give a visual or audible indication of a leak since such a warning may be disregarded by the operator for a period of time sufficient to permit a dangerous accumulation of gasoline in the area around the leak. On the other hand, complete termination of the dispensing of gasoline from the station is not entirely satisfactory. A leak may occur in the system at any time and may be so small that a dangerous accumulation would occur only if the leak went uncorrected for a long period. Under such conditions, complete shut-down of the filling station is unwarranted.

It is the general object of this invention to provide a system for detecting leaks in a supply line through which liquid is intermittently pumped and which indicates the presence of a leak in the line by interrupting full flow through the line when the operator subsequently attempts to dispense liquid therethrough.

A more particular object of this invention is to provide a leak detecting apparatus including a flow control device operative to interrupt flow through a line when the pressure in the line drops below a preselected value and an apparatus operative when the pump is stopped to maintain the preselected pressure in the absence of any leakage therefrom.

Another object of this invention is to provide a leak detector including a pressure responsive device for interrupting the flow through a line if the pressure in the line falls below a preselected value and a measuring chamber communicating with the line to receive a charge of liquid therefrom when the pump is operated and to deliver the liquid to a line when the pump is stopped to maintain the preselected pressure therein.

Still another object of this invention is to provide an apparatus for detecting leaks in a line, as contrasted to changes in volume of liquid in the line due to thermal contraction, which apparatus includes a device for controlling flow through the line and a measuring chamber for actuating the flow controller when the change in volume of the liquid in the line exceeds the thermal contraction of that liquid, and which device is so arranged that the measuring chamber may be located remote from the flow control device and conveniently above the ground level.

These, together with various ancillary objects and advantages of this invention will be more readily appreciated as the same becomes better understood by reference to the following detailed description when taken in connection with the accompanying drawings wherein:

Figure 1 is a diagrammatic view of a service station installation having the leak detecting system of the present invention applied thereto;

Fig. 2 is an enlarged view of a discharge unit with parts broken away and shown in section to illustrate details of construction;

Figs. 3A and 3B are vertical sectional views through the measuring chamber and the flow control device and illustrating the parts in their positions when the measuring chamber is empty and the pump is operating;

Figure 4A:
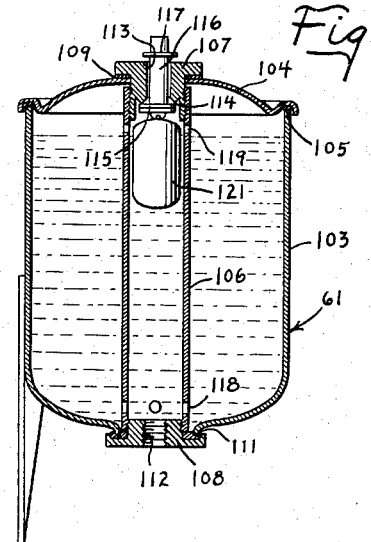
Figs. 4A and 4B are vertical sectional views through the measuring chamber and flow control device, respectively, and illustrating the parts in the positions when the measuring chamber is filled.
Figure 5A:
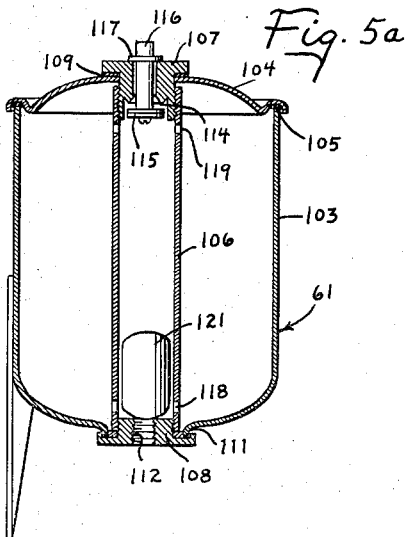
Figs. 5A and 5B are vertical sectional views through the measuring chamber and flow control device illustrating the position of the parts when the measuring chamber is empty and the pump is stopped.

As previously described, the present invention is adapted for detecting leaks in a supply line through which liquid is intermittently pumped and is herein shown applied to a gasoline service station installation. Such an installation is diagrammatically shown in Figure 1 and includes an underground tank 10 for storing a quantity of gasoline, a supply line 11 for delivering gasoline from the tank to one or more pedestals 12, and a pump and motor 13, 14, herein shown of the submersible type, located at the tank for pumping gasoline therefrom through the supply line. The outlet of the pump may be connected to the supply line in any suitable manner and as illustrated herein there is provided a flanged fitting 15 on the upper end of the tank, a discharge head 16 mounted on the fitting and sealed thereto by a gasket 17 and an extension 18 attached to the discharge head and extending upwardly therefrom. The discharge head 16 has a lateral outlet 19 connected to the supply line 11. An adapter unit or thimble 21 is disposed in the discharge head and sealed thereto by spaced O-rings 22 and 23 to define an annular chamber 25 in the discharge head. The thimble has a downwardly facing opening 26 which is connected to the delivery pipe 27 leading from the pump 13, and a lateral passage 28 is formed in the adapter unit to permit liquid to flow from the downwardly facing opening to the annular chamber 25 in the discharge head. A check valve is provided to prevent return flow of liquid from the supply line 11 and includes a member 31 defining an annular valve seat and a valve member 32 cooperable with the seat. The valve member 32 is mounted by a spider 33 and pin 34 on the adapter unit and is yieldably urged by a spring 35 to a position blocking flow through the port 28. As is apparent, the check valve is arranged to open and permit flow from the delivery pipe 27 through the port 28 and chamber 25 to the supply line 11, and to close to prevent return flow. A drop pipe 36 is connected to the adapter unit to permit withdrawal of the adapter unit, the pump and motor assembly from the tank. The power for the motor is supplied through conductors which extend through the adapter unit downwardly into the tank.

A valve mechanism is also provided at the pedestal 12 and so arranged as to be closed when the pump is stopped to thereby entrap the liquid in the supply line 11 between the check valve 32 and the valve mechanism at the pedestal. As shown herein, the supply line 11 at each of the pedestals is connected to a delivery hose 41 having a conventional normally closed discharge valve 42 on the outlet end thereof, which discharge valve is manually operable to its open position to permit dispensing of gasoline therefrom. The pedestals 12 also include a conventional nozzle support 43 and a switch lever 44 which extends over the nozzle support and is pivotally mounted by a bracket 45 on the pedestal. The switch lever is connected through a link 46 to the operating lever 47 of the pump control switch 48 and is also connected through a link 49 to the operating lever 51 of an interlock valve 52. The interlock valve is disposed in the supply line leading to the hose 41 and is normally closed, the interlock valve being opened in response to movement of the switch lever 44 to a position to close the pump control switch 48. A check valve 53 is also commonly provided in the supply line, either before or after the interlock valve, and a meter 55 controlling a register 56 is located in the supply line for measuring the quantity of liquid passing therethrough.

When the discharge valve 32 is closed to stop the dispensing of liquid, the check valve 53 at the pedestal also closes. The pump continues to operate and deliver liquid to the line until the pressure in the line builds up to maximum delivery pressure, that is the full pump discharge pressure less any loss in head due to the difference in elevation between the pump and the supply line. The check valve 32 at the tank then closes to prevent return flow and maintain the pressure in the line. The discharge valve 42 on the hose is thereafter hung on the support 43 and operates the lever 44 to close the interlock valve and open the switch 48 to stop the pump. The supply line is thus effectively isolated from the remainder of the system when the pump is stopped and provision is made for detecting a leak in the supply line between the valve at the tank and the valve at the pedestals. In the specific form herein illustrated, this leak detector includes a pressure responsive flow control apparatus 60 for regulating the flow through the supply line 11 and a measuring chamber 61 for applying fluid pressure to the pressure responsive flow control apparatus when the pump is stopped.

More particularly, the flow control apparatus 60 includes a valve casing 64 having an inlet 65 and an outlet 66 adapted for connection in the supply line 11, as shown in Figure 1. A partition 67 is provided in the casing and defines a port 68 intermediate the inlet and outlet. An extension sleeve 69 is threaded into an upstanding collar 71 on the casing and extends upwardly to a point adjacent the ground level. A cover 72 is attached to the upper end of the sleeve 69 to enclose the same. The sleeve 69 is vented to the interior of the tank 10 through a conduit 74, which conduit has one end connected to the passage 75 in the valve casing 64 and the other end communicating with a passage 76 in the fitting 15, which last mentioned passage communicates with the interior of the tank 10.

Figure 5B:
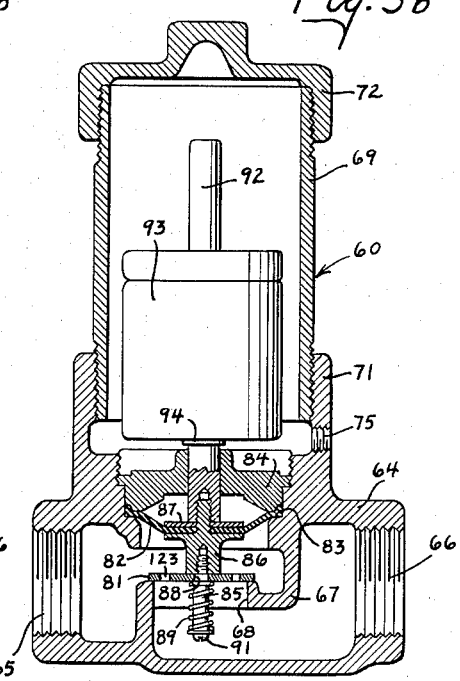

A pressure responsive valve mechanism is provided for controlling flow through the port 68 and includes a valve member 81 cooperable with the port to control flow therethrough and a pressure responsive diaphragm 82 operatively connected to the valve. As shown herein, the casing 64 is counterbored to define a shoulder 83 above the port 68 and the periphery of the diaphragm 82 is clamped to this shoulder by a fitting 84. A stem 85 is attached, by members 86 and 87 to the diaphragm 82 for movement therewith. The stem has a lost motion connection to the valve member 81 and as herein shown is slidably received in a bore 88 in the valve member and a spring 89 is interposed between the valve member and a head 91 on the lower end of the stem. When the diaphragm is in its extended position shown in Fig. 5B, the member 86 engages the valve member 81 and presses the same against the valve seat around the port 68 to control flow therethrough. However, by reason of the lost motion connection between the stem and the valve member, the spring 89 only yieldably urges the valve member toward its open position when the diaphragm is in its raised or retracted position shown in Fig. 3B. A rod 92 is attahced to the diaphragm and extends upwardly into the sleeve 89 and weights 93 are disposed on the rod and supported on a collar 94 thereon to yieldably urge the diaphragm to its lowered position with a substantially constant force.

When the pump 13 is operated, the pressure in the supply line is applied to the underside of the diaphragm 82 and moves the latter to its raised position. However, the pressure in the line raises during a normal dispensing cycle from normal delivery pressure, that is the pressure the pump will maintain in the line when all delivery valves are open, to maximum delivery pressure when all delivery valves are closed. In order to prevent spurious operation of the detector during a normal dispensing cycle, the weights 93 are selected so that the diaphragm 82 will move upwardly to open the valve at a pressure somewhat below normal delivery pressure. When the pump is stopped, the check valve 32 at the tank and the valves at the pedestal are closed so that the liquid in the supply line 11 is entrapped therebetween. As the temperature of the liquid decreases, the effective volume of liquid in the line decreases due to thermal contraction and tends to reduce the pressure on the diaphragm 82. In accordance with the present invention, liquid is supplied to the line 11, when the pump is stopped, sufficient to maintain pressure at the underside of the diaphragm if the change in volume of the liquid is only due to thermal contraction but insufficient to maintain the pressure on the diaphragm if a leak exists in the system. For this purpose, the measuring chamber 61 is connected to the supply line 11 to receive a charge of liquid therefrom when the pump is operated and for delivering liquid thereto when the pump is stopped. The measuring chamber may conveniently be located at one of the pedestals and communicated through a tube 101 with the supply line 11 between the valves at the pedestal 12 and the check valve 32 at the tank.

The measuring chamber includes a receptacle 103 having a cover 104 overlying the upper end thereof and sealed thereto as by a gasket 105. The cover is retained in assembled relation on the receptacle by means of a float guide tube 106 disposed within the receptacle and which threadedly engages fittings 107 and 108 at the top and bottom of the receptacle respectively. The upper fitting 107 has a flange which overlies the cover and which is sealed thereto by a gasket 109. The lower fitting also has a flange overlying the opening at the lower end of the receptacle and which is sealed to the lower end by a gasket 111. As is apparent, by threading the fittings 107 and 108 into the float guide tube, the fittings are drawn together to form a tight seal between the several parts. The lower fitting has a passage 112 therein which is adapted for connection to the conduit 101 leading to the supply line, and the upper fitting has a vent passage 113 extending therethrough and a downwardly facing valve seat 114. A valve member 115 having a stem 116 is loosely received in the passage 113 and is gravity operated to its open position shown in Fig. 3A. A collar 117 on the stem limits opening movement of the valve member.

The guide tube 106 has apertures 118 in the lower end thereof to permit liquid entering from the conduit 101 to flow into the receptacle and passages 119 adjacent the upper end thereof to permit the passage of air therethrough when the valve 115 is opened. A float 121 is disposed in the guide tube and is operative, when the liquid reaches a preselected upper level therein, to engage the valve member 115 and close the same. Since the measuring chamber 61 communicates with the supply line at the discharge side of the flow control valve member 81, ports 123 are provided in the valve member 81 to permit a restricted flow of liquid therethrough when the valve member is closed and the pump is operated.

Figure 4B:
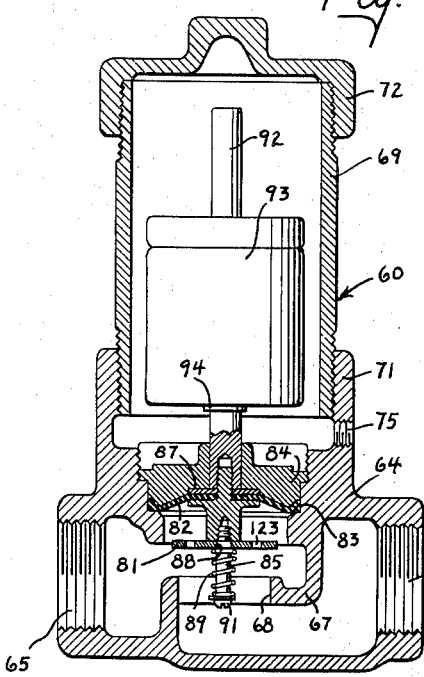

From the foregoing it is thought that the operation of the leak detecting system will be readily understood. The position of the float 21 in the measuring chamber and the flow control valve member 81, at the completion of a dispensing operation, is shown in Figs. 4A and 4B. Under these conditions, the measuring chamber is substantially full of gasoline and the float 121 is in its raised position closing the valve 115. The supply line is under substantially maximum operating pressure and the diaphragm 82 is in its raised position with the valve member opened.

The measuring chamber 61 is positioned at an elevation above the diaphragm 82 such that the static head of liquid in the conduit 101 is sufficient, when any liquid remains in the tank 61, to hold the diaphragm 82 in its raised position and prevent closing of the valve. Consequently, as the volume of liquid in the supply line changes with thermal contraction, liquid will merely flow from the measuring chamber 61 into the supply line. The volume of the measuring chamber is made greater than the maximum thermal contraction of the liquid in the supply line with normal changes in ambient temperature so that the measuring chamber is never emptied due merely to contraction of the liquid. However, when even a relatively small leak exists in the supply line, a volume of liquid greater than that stored in the measuring chamber will pass from the supply line so that the measuring chamber will be emptied. Under these conditions, the pressure at the underside of the diaphragm 82 will decrease sufficient so that the weights 93 will move the diaphragm downwardly to its lowered position shown in Fig. 5B and permit the valve member 81 to close.

When the pump 13 is thereafter operated by closing of the switch 48 at one of the pedestals, full pump discharge pressure will be applied to the upper side of the valve member 81 and to the underside of the diaphragm 82. Since the pressure at the underside of the valve member 81 is relatively low, there is a pressure unbalance thereon which will tend to hold the valve member in its closed position. However, the pressure at the underside of the diaphragm moves the same upwardly and compresses the spring 89 on the stem 91. A restricted flow of liquid will pass through the ports 123 of the valve member 81, which liquid will flow through the conduit 101 to refill the measuring chamber 61. When the measuring chamber is refilled and the exhaust valve 115 closed by the float 121, the pressure will build up at the underside of the valve 81 to substantially pump discharge pressure. At this time, the pressures on the valve member are substantially equalized and the latter is moved to its opened position shown in Fig. 4b by the spring 89.

It is thus apparent that the valve member 81 is closed in the presence of a leak to indicate to the operator that a leak exists in the supply line and that the valve member is automatically reopened after a preselected time delay so as to enable the operator to dispense gasoline.

We claim:

1. In a pumping system including a source of liquid supply, a remote outlet, a supply line extending from the source to said outlet, a pump at said source selectively operable to pump liquid from the source into the line, the combination therewith of a first valve means in the supply line adjacent the source, a second valve means in the supply line adjacent the outlet, means operative while the pump is stopped for closing said first and second valve means to trap the liquid in the line therebetween, a control valve in said line including a valve member movable between a closed position interrupting flow from the pump to the outlet and an open position, means yieldably urging said valve member to its closed position, pressure responsive means operative when the pressure in said line exceeds a preselected pressure for opening said valve member, and means for controlling the pressure in said line, said last-mentioned means including a chamber communicating with said line to receive liquid therefrom when the pump is operating and to deliver liquid to the line when the pump is stopped, and means for maintaining the liquid in the chamber under pressure to force the liquid from the chamber into the line.

2. In a pumping system including a storage tank, a remote delivery outlet, a supply line extending from said tank to said outlet, a pump at said tank selectively operable to pump liquid from the tank into the supply line under pressure, the combination therewith of a first valve means in the supply line adjacent the tank, a second valve means in the supply line adjacent the outlet, means operative when the pump is stopped for closing said first and second valve means to trap the liquid in the supply line therebetween, a flow control means in said supply line between said first and second valve means, a chamber remote from said control means, passage means communicating said chamber with said supply line between said first and second valve means to deliver a charge of liquid to said chamber when said pump is operated, the size of said chamber being correlated to the volume of said supply line between said first and second valve means to store a preselected volume of liquid in said chamber in excess of the thermal contraction of the liquid in the supply line with changes in ambient temperature, means including said chamber for maintaining the line under pressure after said pump is stopped and until said preselected volume has passed from the chamber, and means responsive to the change in pressure in said passage means incident to the passage of said predetermined volume of gasoline from said chamber for operating said flow control means to prevent full flow of gasoline through said supply line.

3. In a pumping system including a storage tank, a remote delivery outlet, a supply line extending from said tank to said outlet, a pump at said tank selectively operable to pump liquid from the tank into the supply line under pressure, the combination therewith of a first valve means in the supply line adjacent the tank, a second valve means in the supply line adjacent the outlet, means operative when the pump is stopped for closing said first and second valve means to trap the liquid in the supply line therebetween, a flow control means in said supply line between said first and second valve means, a chamber remote from said control means, passage means communicating said chamber with said supply line between said first and second valve means to deliver a charge of liquid to said chamber when said pump is operated, the size of said chamber being correlated to the volume of said supply line between said first and second valve means to store a preselected volume of liquid in said chamber in excess of the thermal contraction of the liquid in the supply line with changes in ambient temperature, means including said chamber for maintaining said line under pressure after said pump has stopped and until said preselected volume has passed from the chamber, said flow control means comprising a control valve in said line for regulating the flow of liquid therethrough, and means operative when said pump is operating and responsive to the pressure in said passage means for closing the control valve when said preselected volume of liquid has passed from said chamber.

4. The combination of claim 3 including means operative when said control valve is closed for establishing a minimum flow past said control valve to said outlet.

5. In a pumping system including a storage tank, a remote delivery outlet, a supply line extending from said tank to said outlet, a pump at said tank selectively operable to pump liquid from the tank into the supply line under pressure, the combination therewith of a first valve means in the supply line adjacent the tank, a second valve means in the supply line adjacent the outlet, means operative when the pump is stopped for closing said first and second valve means to trap the liquid in the supply line therebetween, a flow control means in said supply line between said first and second valve means, a chamber remote from said control means, passage means communicating said chamber with said supply line between said first and second valve means to deliver a charge of liquid to said chamber when said pump is operated, the size of said chamber being correlated to the volume of said supply line between said first and second valve means to store a preselected volume of liquid in said chamber in excess of the thermal contraction of the liquid in the supply line with changes in ambient temperature, said chamber being elevated an appreciable distance above said flow control means to maintain said line under pressure after said pump is stopped and until said preselected volume has passed from the chamber, and means responsive to the change in pressure in said passage means incident to the passage of said predetermined volume of liquid from said chamber for operating said flow control means to prevent full flow of liquid through said supply line.

6. The combination of claim 5 including means for venting said chamber to exhaust air and vapor therefrom as said chamber is filled, and means operative when said chamber is filled to a preselected level for preventing flow through said vent means.

7. The combination of claim 5 including vent means in said chamber for exhausting air and vapor therefrom, and float controlled valve means for regulating flow through said vent means.

8. In a pumping system including a storage tank, a remote pedestal having a delivery outlet, a supply line extending from said tank to said outlet, a pump at said tank selectively operable to pump liquid from the tank into the supply line under pressure, the combination therewith of a first valve means in the supply line adjacent the tank, a second valve means in the supply line adjacent the pedestal, means operative when the pump is stopped for closing said first and second valve means to trap the liquid in the supply line therebetween, flow control valve means in said supply line between said first and second valve means, a chamber remote from said control valve means, passage means communicating said chamber with said supply line between said control valve means and said second valve means, the size of said chamber being correlated to the volume of said supply line between said first and second valve means to store a preselected volume of gasoline in said chamber in excess of the thermal contraction of the gasoline in the supply line with changes in ambient temperature, means including said chamber for maintaining the supply line under pressure after said pump is stopped and until said preselected volume has passed from the chamber, said flow control means including a flow passage and a valve member cooperable with said passage to control flow therethrough, means responsive to the change in pressure in said supply line incident to the passage of said predetermined volume of liquid from said chamber for moving said valve member to its closed position, said valve member when closed having one side exposed to the pressure in the said chamber and the other side exposed to the discharge of the pump whereby the valve member is maintained in its closed position until the measuring chamber is refilled.

9. The combination of claim 8 wherein said control valve means has means for passing a restricted flow of gasoline thereby when the valve means is closed to refill said chamber and equalize pressures on said valve member.

10. An automatic leak-detecting apparatus for detecting leaks in a line between an intermittently operated pump and a remote outlet comprising, a valve casing adapted for connection in the line and defining a port, a pressure operated valve means cooperable with said port for controlling flow therethrough, a chamber elevated an appreciable distance above said valve means, passage means, for communicating said chamber with said line and with said pressure operated valve means to deliver a charge of liquid from the line to the chamber when the pump is operated and to apply fluid pressure to said valve means and to said line correlative with the liquid level in the chamber when the pump is stopped, said pressure operated valve means being operative when the pump is operated to open and pass liquid thereby when the liquid is above a preselected level in the chamber and to close and interrupt flow when said liquid level in the chamber falls below said preselected level.

11. The combination of claim 10 wherein said chamber includes a vent for exhausting vapor therefrom, and float controlled valve means in said chamber for blocking flow through said vent when the liquid in the chamber reaches a preselected upper level.

12. An apparatus for detecting leaks in a line between an intermittently operated pump and a remote outlet comprising, a valve casing adapted for connection in the line and having an inlet and an outlet and a port between said inlet and outlet, a valve member cooperable with said port for controlling liquid flow therethrough and when closed having one side exposed to fluid pressure at said inlet and the other side exposed to fluid pressure at said outlet, a pressure responsive movable wall operatively connected to said valve member and having one side thereof exposed to fluid pressure at said inlet, means including a remote chamber for applying fluid pressure to said unit correlative with the liquid level in said chamber to open said valve member when the liquid in the chamber is above a preselected level and to close said valve member when the liquid falls below said preselected level, said fluid pressure applying means including means communicating said chamber with said line to maintain the latter under the pressure of the liquid in the chamber when the pump is stopped.

13. An apparatus for detecting leaks in a line between an intermittently operated pump and a remote outlet comprising, a valve casing adapted for connection in the line and having an inlet and an outlet and a port between said inlet and outlet, a valve member cooperable with said port for controlling liquid flow therethrough and when closed having one side exposed to fluid pressure at said inlet and the other side exposed to fluid pressure at said outlet, a pressure responsive movable wall having one side exposed to fluid pressure at said inlet, lost motion means operatively connecting said member to said wall, said lost motion means including means for moving said member to its closed position when the pressure at said inlet drops below a preselected valve and means yieldably urging said member to its open position when the pressure at the inlet exceeds said preselected valve, a remote chamber communicating with said outlet operative when the pump is stopped for maintaining the outlet at a pressure in excess of said preselected pressure when the liquid in the chamber is above a preselected level whereby to hold the valve member open and to maintain the outlet at a pressure below said preselected pressure when the liquid in the chamber is below said preselected level whereby to close the valve member, said valve member when closed being held in its closed position until the pressures on opposite sides thereof are substantially equalized.

14. The combination of claim 13 including means operative when the valve member is closed for providing restricted flow from the inlet to the outlet whereby to gradually refill said chamber and equalize the pressures on the valve member a time interval after the pump is operated.

References Cited in the file of this patent

UNITED STATES PATENTS

| | | |
|---|---|---|
| 1,631,454 | Bambach et al. | June 7, 1927 |
| 2,013,431 | Bechtold | Sept. 3, 1935 |
| 2,043,035 | De Lancy | June 2, 1936 |
| 2,732,100 | Jackson et al. | Jan. 24, 1956 |